(12) United States Patent
Uehara (10) Patent No.: US 11,019,260 B2
(45) Date of Patent: May 25, 2021

(54) IMAGE CAPTURING APPARATUS

(71) Applicant: CANON KABUSHIKI KAISHA, Tokyo (JP)

(72) Inventor: Takumi Uehara, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/566,437

(22) Filed: Sep. 10, 2019

(65) Prior Publication Data

US 2020/0092472 A1    Mar. 19, 2020

(30) Foreign Application Priority Data

Sep. 13, 2018 (JP) .............................. JP2018-171529

(51) Int. Cl.
*H04N 5/225* (2006.01)
*H04N 5/232* (2006.01)
*H04N 5/247* (2006.01)

(52) U.S. Cl.
CPC ....... *H04N 5/23238* (2013.01); *H04N 5/2254* (2013.01); *H04N 5/247* (2013.01)

(58) Field of Classification Search
None
See application file for complete search history.

(56) References Cited

U.S. PATENT DOCUMENTS

| | | | | |
|---|---|---|---|---|
| 4,643,541 A * | 2/1987 | Matsubara | ............. | G02B 21/20 359/377 |
| 8,542,289 B1 * | 9/2013 | McClatchie | ........... | H04N 5/247 348/211.11 |
| 9,602,700 B2 * | 3/2017 | Ahiska | ............. | G08B 13/19691 |
| 10,462,363 B2 * | 10/2019 | Uemura | ............. | H04N 5/23238 |
| 2007/0009247 A1 * | 1/2007 | Maeda | ................ | H04M 1/0237 396/72 |
| 2008/0025571 A1 * | 1/2008 | Nakao | .................. | H04N 5/3415 382/107 |
| 2008/0068452 A1 * | 3/2008 | Nakao | .................. | G02B 3/0075 348/36 |

(Continued)

FOREIGN PATENT DOCUMENTS

JP    2002-320124 A    10/2002

OTHER PUBLICATIONS

Search report IP.com.*

(Continued)

*Primary Examiner* — Mohammad J Rahman
(74) *Attorney, Agent, or Firm* — Cowan, Liebowitz & Latman, P.C.

(57) ABSTRACT

An image capturing apparatus (100) including a plurality of image capturing units (10a to 10c) that are arranged with reference to a predetermined axis (101), each of the plurality of image capturing units includes a first optical element (11) arranged at an object side, the first optical element having a first axis (OA1), a second optical element (13) arranged at an image side, the second optical element having a second axis (OA2), a third optical element (12) configured to bend a light beam from the first optical element to be introduced to the second optical element, and an image sensor 14), and in at least one of the plurality of image capturing units, the second optical axis is different from a direction of the predetermined axis.

9 Claims, 9 Drawing Sheets

(56) References Cited

U.S. PATENT DOCUMENTS

| | | | | |
|---|---|---|---|---|
| 2009/0040293 | A1* | 2/2009 | Foo | H04N 5/23206 |
| | | | | 348/36 |
| 2012/0044413 | A1* | 2/2012 | Terada | G03B 17/17 |
| | | | | 348/374 |
| 2016/0234411 | A1* | 8/2016 | Yin | G02B 5/045 |
| 2018/0210465 | A1* | 7/2018 | Qu | H04N 5/23203 |
| 2019/0058811 | A1* | 2/2019 | Douady-Pleven | H04N 5/2258 |
| 2019/0164430 | A1* | 5/2019 | Nix | B60R 1/00 |
| 2019/0361126 | A1* | 11/2019 | Abari | G01S 17/86 |
| 2020/0088976 | A1* | 3/2020 | Song | H04N 5/23238 |

OTHER PUBLICATIONS

Search report google.*
F. Jabar, J. Ascenso and M. P. Queluz, "Perceptual Analysis of Perspective Projection for Viewport Rendering in 360° Images," 2017 IEEE International Symposium on Multimedia (ISM), Taichung, 2017, pp. 53-60, doi: 10.1109/ISM.2017.18.*

* cited by examiner

IMAGE CAPTURING APPARATUS

BACKGROUND OF THE INVENTION

Field of the Invention

The present invention relates to an image capturing apparatus including a plurality of optical systems.

Description of the Related Art

Conventionally, an image capturing apparatus that includes a plurality of optical systems and that is capable of ultra-wide-field imaging such as panoramic imaging and omnidirectional imaging is known. Further, as a method of obtaining a captured image of an ultra-wide field of view, a method of connecting a plurality of images from the captured image obtained by the plurality of optical systems by a method such as pattern matching is known. In this case, when entrance pupil positions of the optical systems constituting the image capturing apparatus are different, a parallax occurs between the captured images, and a shift occurs when the captured images are connected.

Therefore, an image capturing apparatus is proposed that reduces such parallax between the captured images. For example, Japanese Patent Laid-open No. 2002-320124 discloses an image capturing apparatus in which the entrance pupil is set outside a lens barrel, incident light is bent by a reflecting member, and the entrance pupil is formed on an image side relative to the reflecting member in order to put all the entrance pupil positions within a predetermined range.

However, in the image capturing apparatus disclosed in Japanese Patent Laid-open No. 2002-320124, when image sensors are enlarged, it is necessary to separate the optical systems in order to avoid interference between the image sensors and it is difficult to put the entrance pupil positions within the predetermined range. As a result, it is difficult to reduce the parallax between the captured images.

SUMMARY OF THE INVENTION

The present invention provides an image capturing apparatus capable of acquiring a high-quality wide-field image even when an image sensor is enlarged.

An image capturing apparatus as one aspect of the present invention includes a plurality of image capturing units that are arranged with reference to a predetermined axis, each of the plurality of image capturing units includes a first optical element arranged at an object side, the first optical element having a first axis, a second optical element arranged at an image side, the second optical element having a second axis, a third optical element configured to bend a light beam from the first optical element to be introduced to the second optical element, and an image sensor, and in at least one of the plurality of image capturing units, the second optical axis is different from a direction of the predetermined axis.

Further features of the present invention will become apparent from the following description of exemplary embodiments with reference to the attached drawings.

DESCRIPTION OF THE EMBODIMENTS

Exemplary embodiments of the present invention will be described below with reference to the accompanied drawings.

First Embodiment

Figure 1:
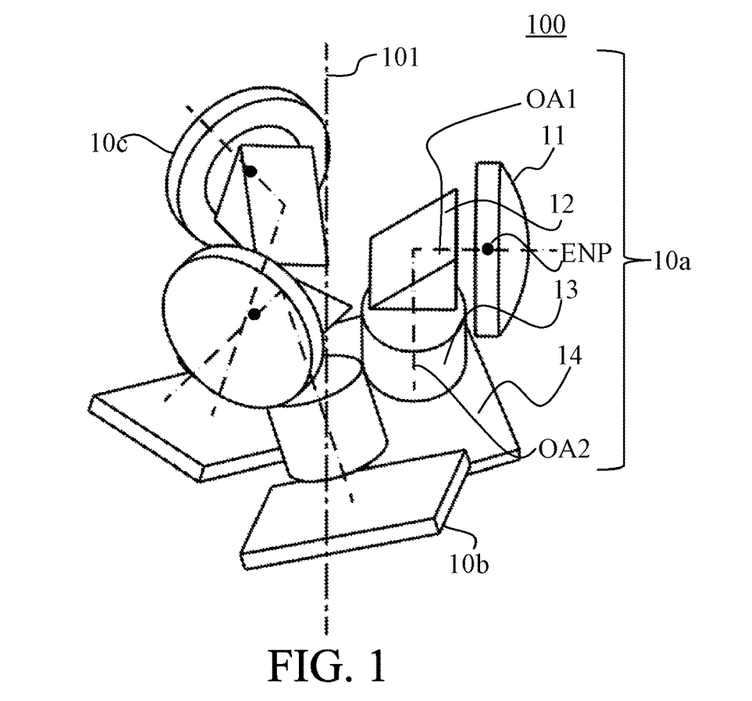
FIG. 1 is an overhead view of an image capturing apparatus in a first embodiment.
Figure 2:
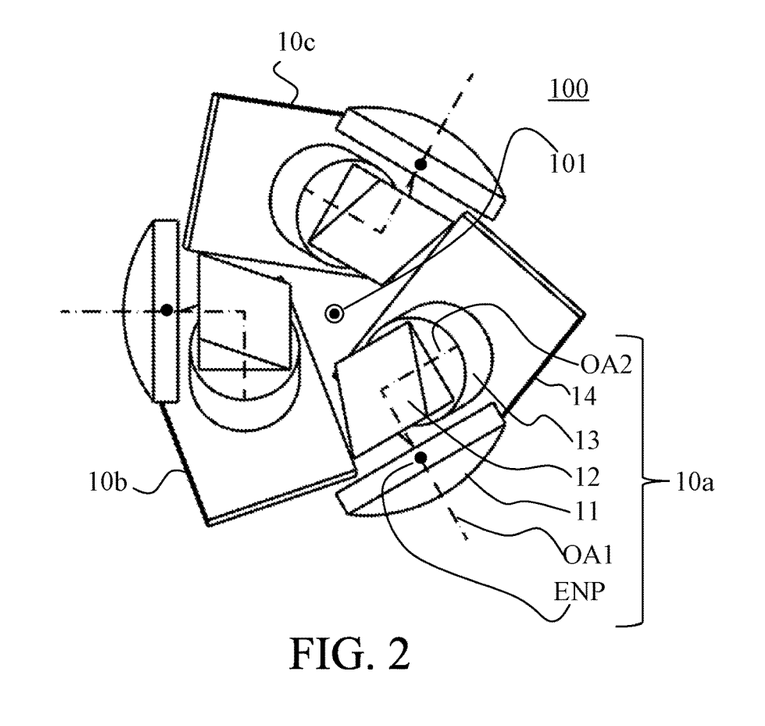
FIG. 2 is a top view of the image capturing apparatus in the first embodiment.

First, referring to FIGS. 1 and 2, a schematic configuration of an image capturing apparatus in a first embodiment of the present invention will be described. FIG. 1 is an overhead view of an image capturing apparatus 100 in this embodiment. FIG. 2 is a top view of the image capturing apparatus 100.

The image capturing apparatus 100 includes three camera units (image capturing units) 10 (10a, 10b, and 10c). The camera units 10a, 10b, and 10c are arranged in three directions in rotational symmetry at every 120 degrees around a reference axis (predetermined axis) 101. The image capturing apparatus 100 can combine images acquired by the camera units 10a, 10b, and 10c to generate a wide-field image. All of the three camera units 10a, 10b, and 10c have substantially the same configuration. Therefore, hereinafter, only the configuration of the camera unit 10a will be described.

The camera unit 10a includes an object-side lens (first optical element) 11, a prism (third optical element) 12, an image-side lens (second optical element) 13, and an image sensor 14. An optical axis OA1 is an optical axis (first optical axis) of the object-side lens 11. An optical axis OA2 is an optical axis (second optical axis) of the image-side lens 13. The prism 12 includes an entrance surface perpendicular to the optical axis OA1, an exit surface perpendicular to the optical axis OA2, and a reflecting surface for bending a light beam in a direction of the optical axis OA1 toward a direction of the optical axis OA2. The optical axis OA1 and the optical axis OA2 are orthogonal to each other at the reflecting surface of the prism 12. An entrance pupil ENP is a point where a ray before entering the object-side lens 11 is extended to intersect with the optical axis OA1 of chief rays of the light beam that enters from the object side to form an image on the image sensor 14.

Figure 3:
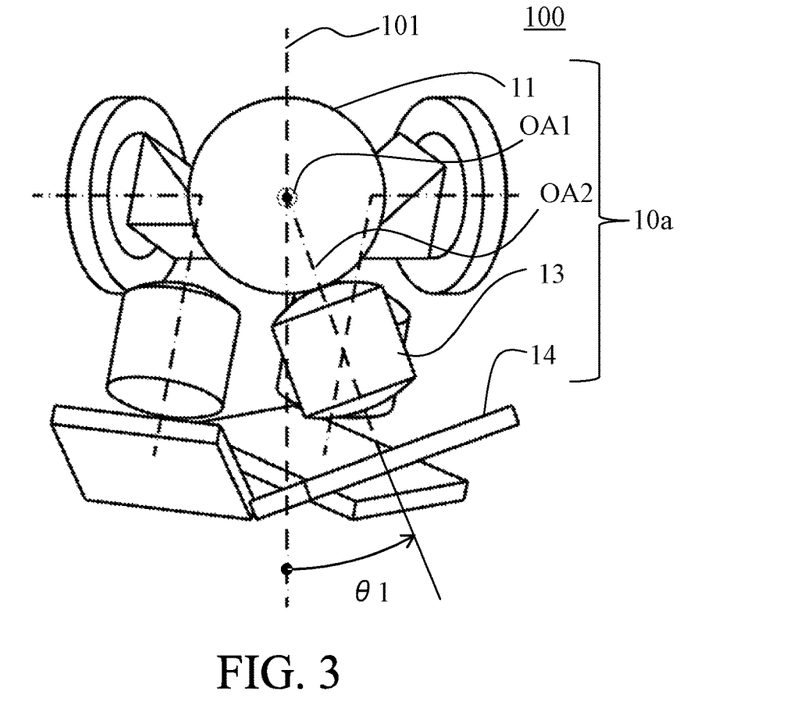
FIG. 3 is a view of the image capturing apparatus along an optical axis OA1 in the first embodiment.

Next, referring to FIGS. 3 and 4, the relationship between the directions of the optical axes OA1 and OA2 of the image capturing apparatus 100 and the directions of the image sensor 14 will be described. FIG. 3 is a view of the camera unit 10a viewed from the object side along the optical axis OA1. The optical axis OA1 of the camera unit 10a is directed in a direction (perpendicular direction) substantially orthogonal to the reference axis 101. The optical axis OA2 forms a predetermined angle (angle θ1) with respect to the reference axis 101 when viewed from the object side along the optical axis OA1. In this embodiment, the angle θ1 is 20 degrees, but it is not limited to this.

Figure 4:
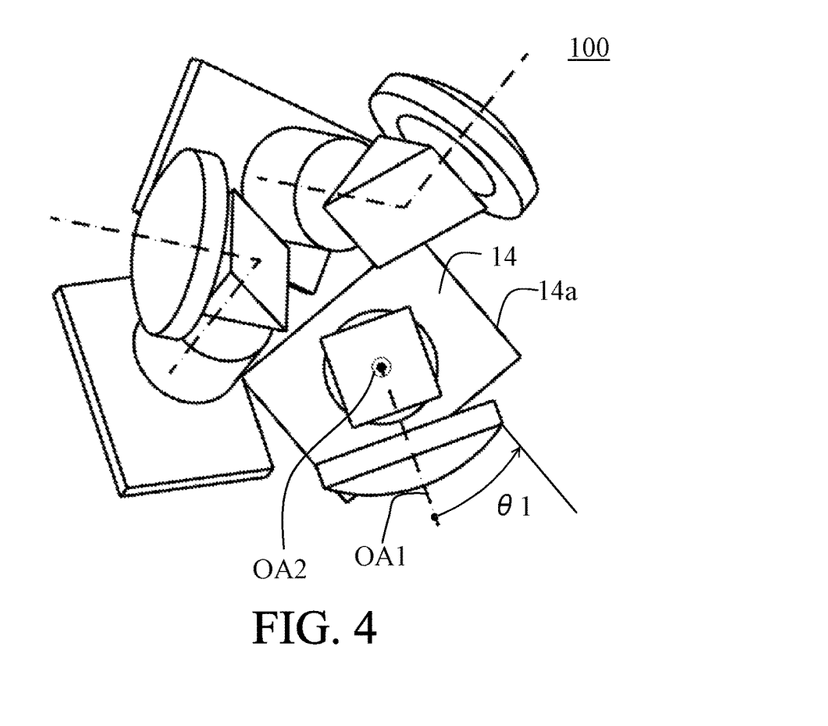
FIG. 4 is a view of the image capturing apparatus along an optical axis OA2 in the first embodiment.

FIG. 4 is a view of the camera unit 10a viewed from the prism 12 along the optical axis OA2. When the image sensor 14 is viewed from the prism 12 along the optical axis OA2, the image sensor 14 is disposed so that the vertical or horizontal side 14a of the rectangular (the outline of the image sensor 14) forms the angle θ1 with respect to the optical axis OA1. In this embodiment, the angle formed by the optical axis OA2 with respect to the reference axis 101 and the direction of the optical axis OA2 are equal to the angle formed by the vertical or horizontal side 14a of the rectangular of the image sensor 14 with respect to the optical axis OA1 and the direction of the side 14 are arranged to be equal to each other. Thus, as described below, the vertical direction of the image acquired by the image sensor 14 coincides with the direction of the reference axis 101.

When combining the images acquired by the camera units 10a, 10b and 10c to generate a wide-field composite image, it is preferred that the positions (entrance pupil positions) of the entrance pupils ENP of the camera units 10a, 10b and 10c come close to each other. By bringing the positions of the entrance pupils ENP closer to each other, it is possible to reduce the displacement due to the parallax of the camera units 10a, 10b, and 10c to obtain a good composite image. That is, it is preferred that the camera units 10a, 10b and 10c are disposed close to each other. In this embodiment, the prism 12 of the camera unit 10a, the image-side lens 13, and the image sensor 14 are disposed at positions sufficiently close to each other to the extent that they do not interfere the other camera units 10b and 10c.

Figure 5:
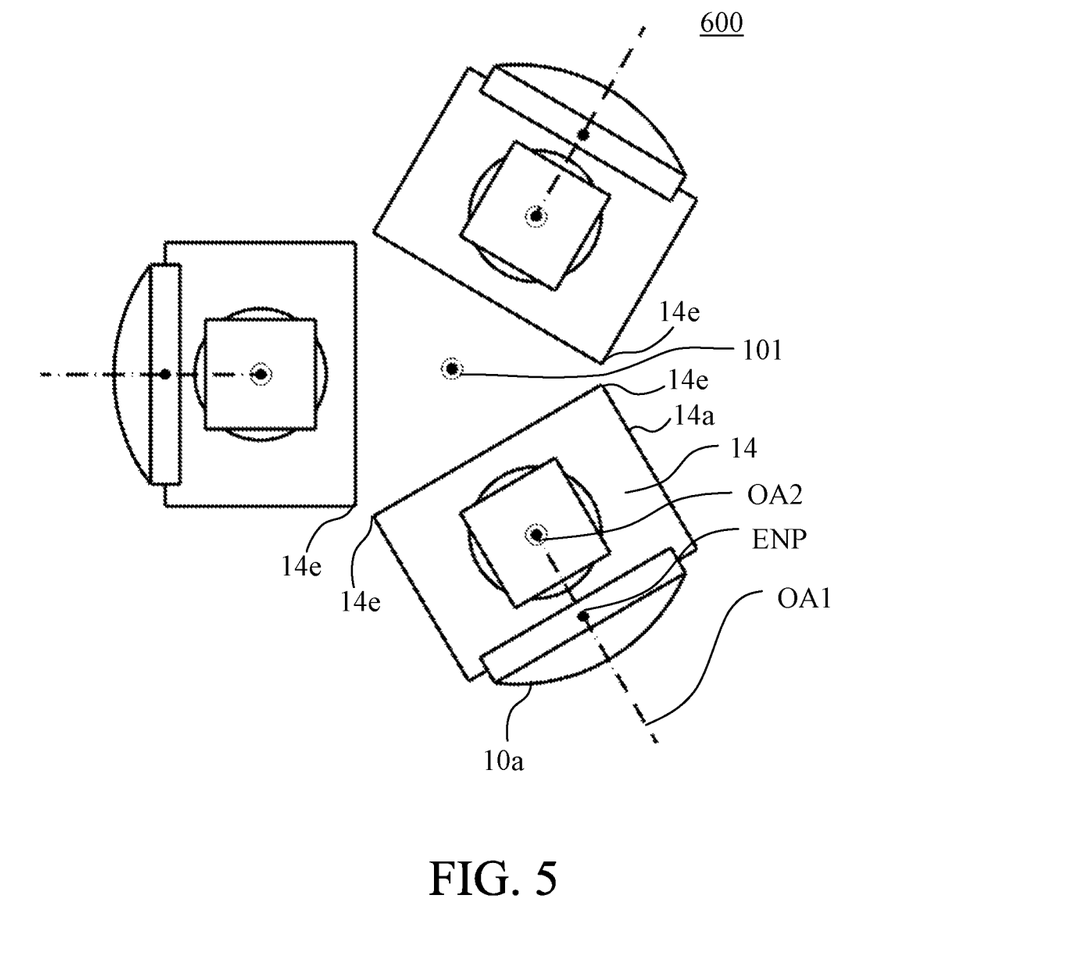
FIG. 5 is a top view of the image capturing apparatus as a comparative example.

Next, referring to FIG. 5, an effect of arranging the optical axis OA2 at a predetermined angle (angle θ1) with respect to the reference axis 101 will be described. FIG. 5 is a top view of an image capturing apparatus 600 as a comparative example. In the image capturing apparatus 600 as a comparative example of FIG. 5, for example, as disclosed in Japanese Patent Laid-open No. 2002-320124, the optical axis OA2 of each camera unit is parallel to the reference axis 101.

When the optical axis OA2 of each camera unit is parallel to the reference axis 101, as illustrated in FIG. 5, corner portions 14e of the image sensor 14 of each camera unit are close to each other. When the size of the image sensor 14 increases, it is necessary to move each camera unit away from the reference axis 101 in order to avoid interference between the image sensors 14 of the respective camera units. Comparing the image capturing apparatus 600 as the comparative example of FIG. 5 with the image capturing apparatus 100 of this embodiment of FIG. 2, the image capturing apparatus 100 of this embodiment can be miniaturized and the entrance pupils ENP of the respective camera units can be closer to each other.

Figure 6A:
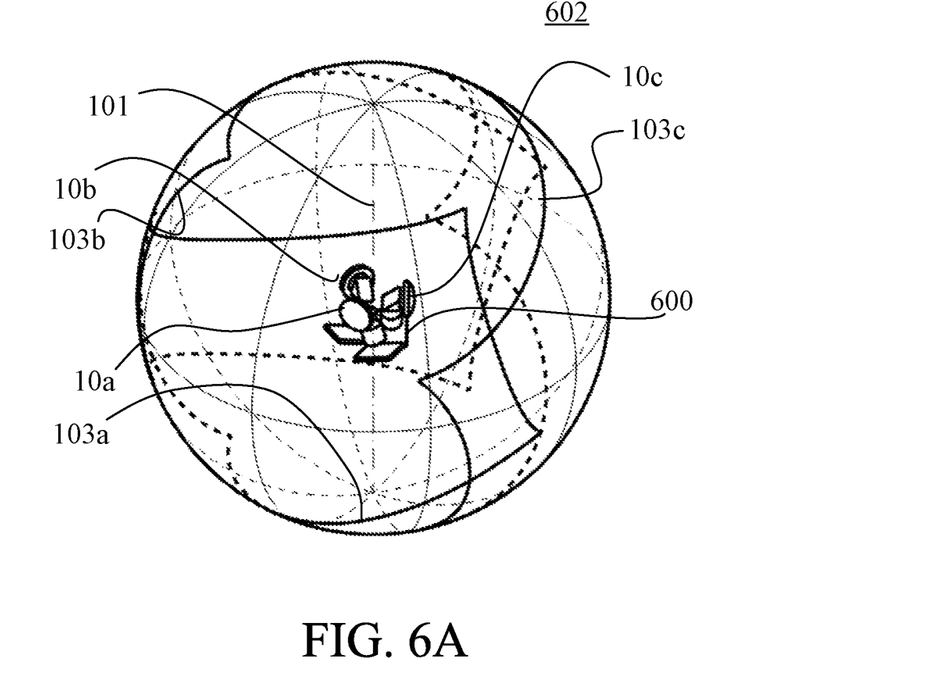
FIGS. 6A and 6B are explanatory diagrams of an imaging range of the image capturing apparatus as a comparative example.
Figure 6B:
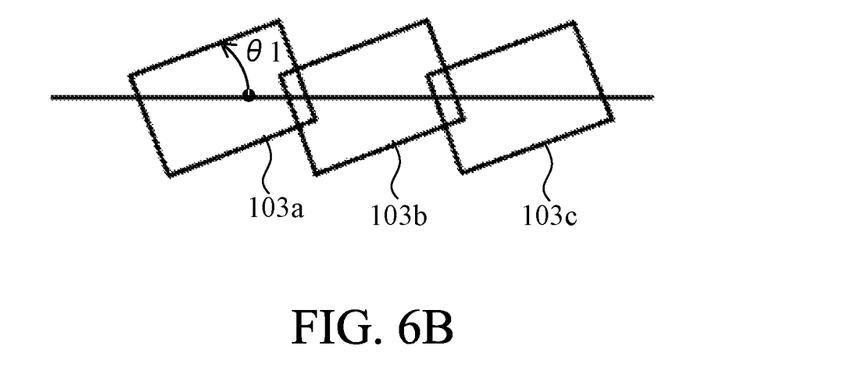

Next, referring to FIGS. 6A, 6B, 7A, and 7B, an effect of arranging the vertical and horizontal sides 14a of the rectangular (outer shape) of image sensor 14 at a predetermined angle (θ1) with respect to optical axis OA1 will be described. FIG. 6A is an explanatory view of an imaging range when the side 14a of the image sensor 14 is not inclined with respect to the optical axis OA1 (when the side 14a and the optical axis OA1 are parallel) in the image capturing apparatus 600 as a comparative example, which illustrates a virtual celestial sphere 602 surrounding the image capturing apparatus 600. FIG. 6B is a developed view of FIG. 6A.

In FIG. 6A, reference numerals 103a, 103b, and 103c denote imaging ranges of images captured by the camera units 10a, 10b and 10c, respectively. When the optical axis OA2 is inclined by an angle θ with respect to the reference axis 101 while the direction of the side 14a of the image sensor 14 is not inclined with respect to the optical axis OA1, the imaging range 103a is inclined by the angle θ1 at which the optical axis OA2 is inclined with respect to the reference axis 101. For example, when a landscape is captured with the reference axis 101 oriented vertically and the optical axis OA1 oriented horizontally, as illustrated in FIG. 6B, horizontal lines in the images captured by the camera units 10a, 10b, and 10c are not horizontal but are inclined by the angle θ1.

A case will be considered in which the range captured by each of the three camera units 10a, 10b and 10c is projected onto the celestial sphere 102. In this case, since the imaging ranges 103a, 103b and 103c captured by the camera units 10a, 10b and 10c, respectively, are inclined by the angle θ1 with respect to the reference axis 101, overlapping areas of the imaging ranges 103a, 103b and 103c are narrowed in the direction of the reference axis 101. As a result, an image missing area that is not included in any of the imaging ranges 103a, 103b, and 103c is generated. When a composite image is generated avoiding the image missing area, the size of the composite image becomes narrow in the vertical direction (direction of the reference axis 101).

Figure 7A:
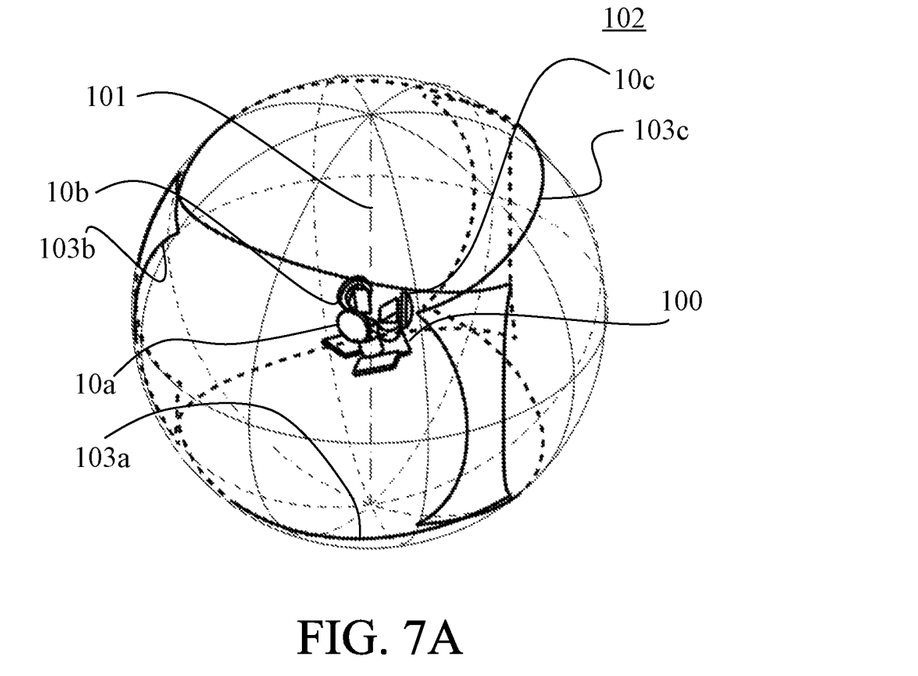
FIGS. 7A and 7B are explanatory diagrams of the imaging range of the image capturing apparatus in the first embodiment.
Figure 7B:
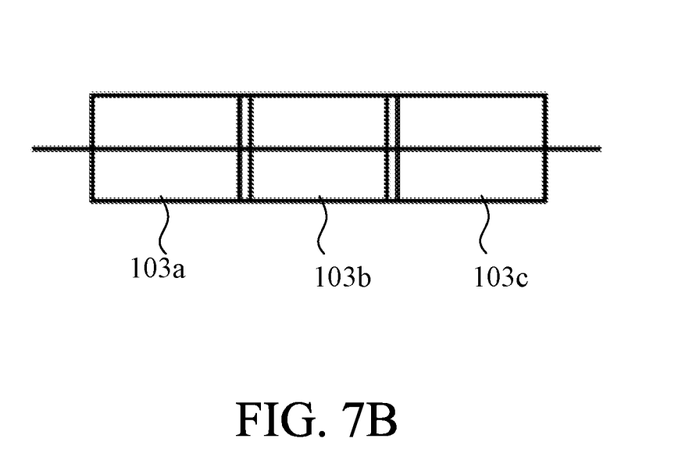

FIG. 7A is an explanatory diagram of the imaging range when the side 14a of the image sensor 14 is inclined by the angle θ1 with respect to the optical axis OA1 in the image capturing apparatus 100 of this embodiment, which illustrates a virtual celestial sphere 102 surrounding the image capturing apparatus 100. FIG. 7B is a developed view of FIG. 7A.

When the image sensor 14 is inclined by a predetermined angle (angle θ1) with respect to the optical axis OA1 as in the image capturing apparatus 100 of this embodiment, the inclination of the imaging ranges 103a, 103b, and 103c with respect to the horizontal line is cancelled. Therefore, when a landscape is photographed by the image capturing apparatus 100, the horizontal line and the vertical line in the images captured by the camera units 10a, 10b and 10c coincide with the horizontal and vertical directions of the image, respectively.

When the respective ranges photographed by the three camera units 10a, 10b and 10c are projected onto the celestial sphere 102, the overlapping areas of the imaging ranges 103a, 103b and 103c captured by the respective camera units are wider in the direction of the reference axis 101 compared with the comparative example of FIG. 6B. For this reason, according to this embodiment, the size of the composite image in the vertical direction (direction of the reference axis 101) can be increased.

Second Embodiment

Next, referring to FIGS. 8 and 9, an image capturing apparatus in a second embodiment of the present invention will be described. An image capturing apparatus 200 of this embodiment is different from the image capturing apparatus 100 of the first embodiment in that the image capturing apparatus 200 includes a camera unit (zenith camera unit, or second image capturing unit) 20 in a zenith direction. The camera unit 20 is a second image capturing unit capable of imaging a range outside the imaging ranges of the plurality of image capturing units 10a to 10c, and is a rectilinear optical system having an optical axis (third optical axis) OA3 parallel to a direction of a reference axis 201. The other configurations of the image capturing apparatus 200 are the same as those of the image capturing apparatus 100 of the first embodiment, and thus the descriptions thereof will be omitted.

Figure 8:
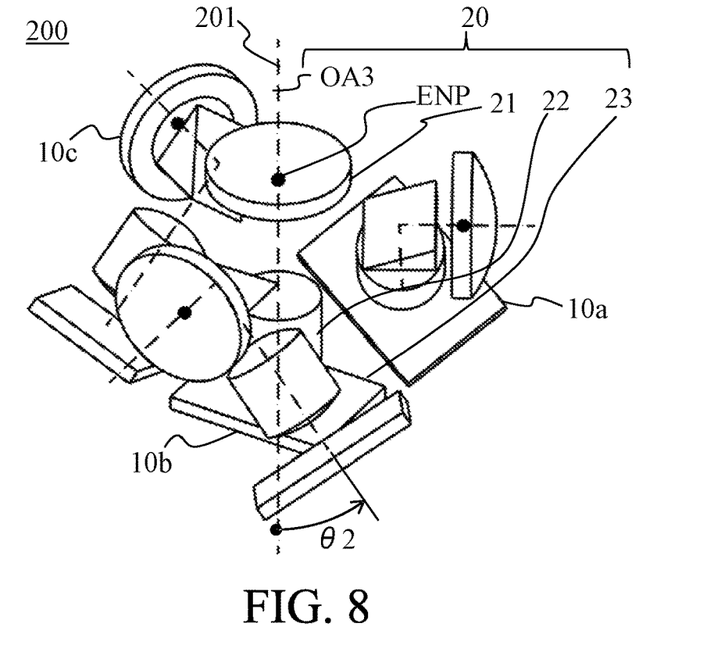
FIG. 8 is an overhead view of an image capturing apparatus in a second embodiment.
Figure 9:
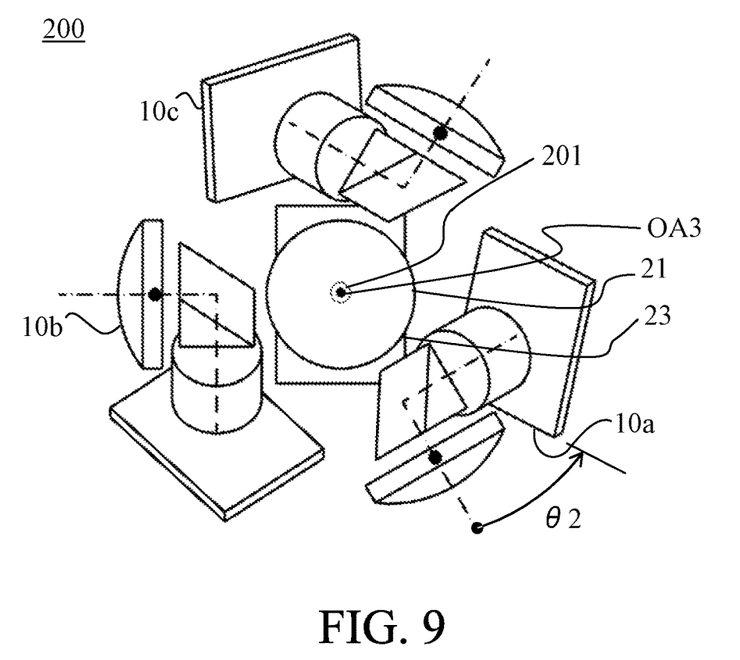
FIG. 9 is a top view of the image capturing apparatus in the second embodiment.

FIG. 8 is an overhead view of the image capturing apparatus 200 in this embodiment. FIG. 9 is a top view of the image capturing apparatus 200. The image capturing apparatus 200 includes three camera units 10 (10a, 10b, 10c) similarly to the first embodiment, and a camera unit 20 facing in a zenith direction. The image capturing apparatus 200 can combine images acquired by the camera units 10a, 10b, 10c and the camera unit 20 to generate a wide-field image.

The camera units 10a, 10b, and 10c are arranged in rotational symmetry of 120 degrees with respect to the reference axis 201. The camera unit 20 is disposed on the reference axis 201. The camera unit 20 includes an object-side lens 21, an image-side lens 22, and an image sensor 23. The optical axis OA3 of the camera unit 20 is disposed on substantially the same straight line as the reference axis 201. The camera unit 20 performs imaging in a direction of the reference axis 201 which is outside the imaging ranges of the camera units 10a, 10b, and 10c arranged laterally. According to the configuration of this embodiment, by combining the images captured by the camera units 10a, 10b, 10c and the camera unit 20, it is possible to generate a composite image that covers a wider field of view than the image capturing apparatus 100 of the first embodiment.

In this embodiment, it is preferred that the position of an entrance pupil ENP of the camera unit 20 is disposed near the position of entrance pupils ENP of the other camera units 10a, 10b, and 10c. As a result, when combining images between the camera unit 20 and the other camera units 10a, 10b, and 10c, it is possible to reduce an image shift due to a position displacement of the entrance pupils ENP. Further, in this embodiment, it is preferred that the camera unit 20 is not disposed close to any one of the camera units 10a, 10b, 10c, but the camera unit 20 is disposed at an equal distance to all the three camera units 10a, 10b, 10c. From such a viewpoint, as described above, it is preferred that the camera unit 20 is disposed on the reference axis 201 as a rotational symmetry axis of the arrangements of the camera units 10a, 10b, and 10c, and the object-side lens 21 is disposed to overlap the object-side lens 11.

On the other hand, when such arrangements are adopted, a distance between the image sensor 14 of each of the camera units 10a, 10b and 10c and the image sensor 23 of the camera unit 20 comes close to each other. As a result, when large image sensors are provided, it is necessary to move the camera units 10a, 10b and 10c away from the reference axis 201 in order to avoid interference between the image sensors. In this case, similarly to the first embodiment, the optical axes OA2 of the camera units 10a, 10b, and 10c are inclined with respect to the reference axis 201 by a predetermined angle (angle θ2). Thus, the image sensor 14 of each of the camera units 10a, 10b, 10c moves in a direction away from the image sensor 23 of the camera unit 20. Therefore, even when the size of the image sensor is enlarged, the camera unit 20 can be provided without moving the positions of the entrance pupils ENP of the camera units 10a, 10b, and 10c away from each other.

Third Embodiment

Figure 10:
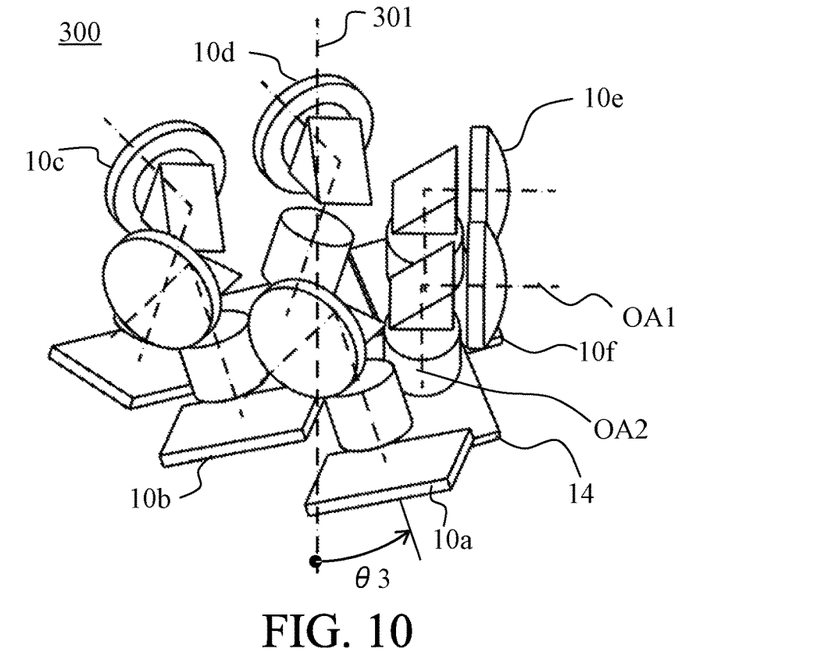
FIG. 10 is an overhead view of an image capturing apparatus in a third embodiment.
Figure 11:
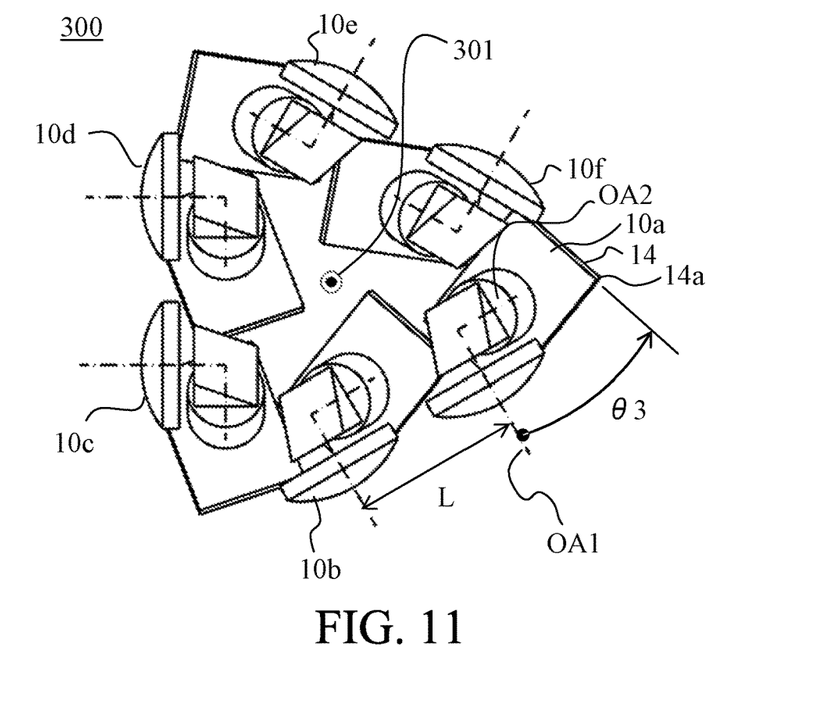
FIG. 11 is a top view of an image capturing apparatus in the third embodiment.

Next, referring to FIGS. 10 and 11, an image capturing apparatus in a third embodiment of the present invention will be described. An image capturing apparatus 300 of this embodiment is different from the image capturing apparatus 100 of the first embodiment in that the image capturing apparatus 300 includes six camera units 10 (10a, 10b, 10c, 10d, 10e, and 10f), and is capable of stereoscopic imaging. Other configurations of the image capturing apparatus 300 are the same as those of the image capturing apparatus 100 of the first embodiment, and thus the descriptions thereof will be omitted.

The camera units 10a to 10f are arranged so as to be rotationally symmetrical by 120 degrees with respect to a reference axis 301, facing in the same direction every two camera units. The two camera units 10a and 10b facing in the same direction are disposed apart from each other by a predetermined base length L for the stereoscopic imaging. The same applies to each of the two camera units 10c and 10d and the two camera units 10e and 10f.

The six camera units 10a to 10f function as three camera units 10a, 10c, and 10e that acquire left-eye images, and three camera units 10b, 10d, and 10f that acquire right-eye images. The three images captured by the three camera units 10a, 10c, and 10e that acquire the left-eye images are combined into a left-eye wide-angle image. The three images captured by the three camera units 10b, 10d, and 10f that acquire the right-eye image are combined into a right-eye wide-angle image.

In this embodiment, it is preferred that the left-eye cameras and the right-eye cameras are arranged such that each of a distance between the left-eye cameras and a distance between the right-eye cameras is close to each other in order to reduce an image shift in combining the images. On the other hand, it is preferred that the optical axis OA1 of the left-eye camera and the optical axis OA1 of the right-eye camera facing in the same direction may be separated by about 40 to 60 mm as the base length L necessary to obtain a stereoscopic image.

In this case, it is necessary to consider the interference of the image sensors 14 between the left-eye camera (for example, the camera unit 10a) and the adjacent right-eye camera (for example, the camera unit 10f) facing another direction. In this embodiment, similarly to the first embodiment, as viewed from the object side of the camera unit 10a to 10f, the optical axis OA2 is inclined by a predetermined angle (angle θ3) with respect to the reference axis 301. According to this arrangement, a space between the image sensor of the left-eye camera and the image sensor of the adjacent right-eye camera at an angle of 120 degrees increases, and correspondingly the camera units 10a to 10f can be moved in a direction to be closer to the reference axis 301. Therefore, it is possible to reduce each of the deviation of the entrance pupil positions of the right-eye cameras and the deviation of the entrance pupil positions of the left-eye cameras.

Further, as viewed from the prism side along the optical axis OA2, the image sensor is arranged to be inclined by a predetermined angle (angle θ3) with respect to the optical axis OA1. As a result, the vertical and horizontal directions of the images captured by the camera units 10a to 10f coincide with each other, and the image composition can be performed easily. In addition, an overlapping area of the imaging ranges captured by the camera units 10a to 10f in a direction of the reference axis 301 can be increased, and the size of the composite image can be made larger.

Fourth Embodiment

Figure 13:
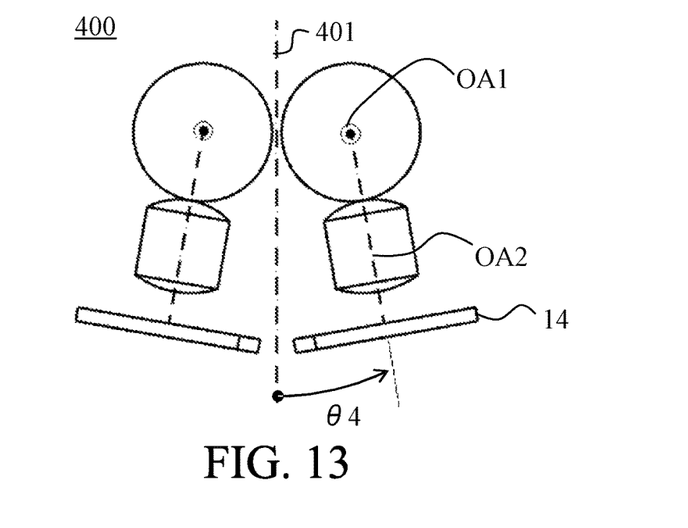
FIG. 13 is a view of the image capturing apparatus along an optical axis OA1 in the fourth embodiment.
Figure 14:
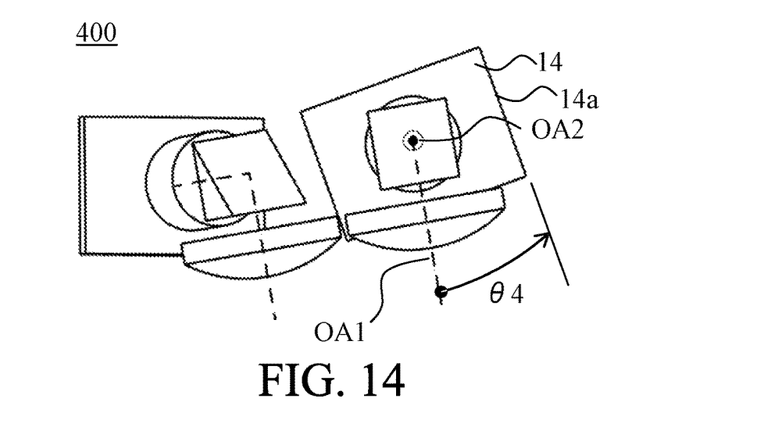
FIG. 14 is a view of the image capturing apparatus along an optical axis OA2 in the fourth embodiment.

Next, referring to FIGS. 12 to 14, an image capturing apparatus in a fourth embodiment of the present invention will be described. An image capturing apparatus 400 of this embodiment includes two camera units 10a and 10b arranged side by side in the same direction. The image capturing apparatus 400, for example, can perform stereoscopic imaging using a parallax, or simultaneously perform wide-angle imaging and telephoto imaging by making focal lengths of the two camera units 10a and 10b different from each other. In addition, the image capturing apparatus 400 can be used as a multispectral camera that acquires an image of electromagnetic waves with different frequency bands for each camera unit.

Figure 12:
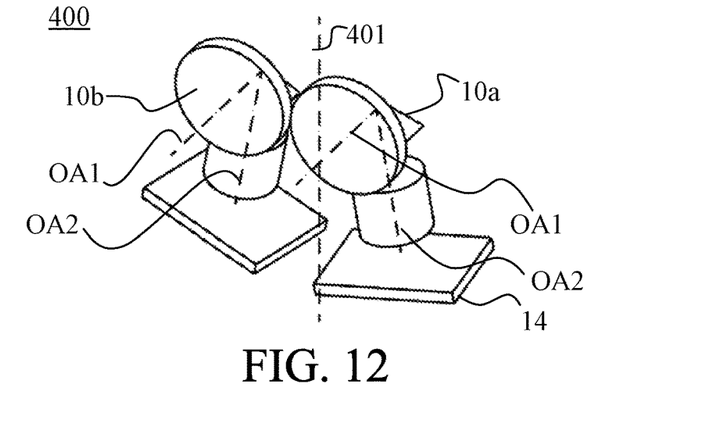
FIG. 12 is an overhead view of an image capturing apparatus in a fourth embodiment.

FIG. 12 is an overhead view of the image capturing apparatus 400 in this embodiment. FIG. 13 is a view of the image capturing apparatus 400 viewed from the object side along the optical axis OA1. FIG. 14 is a view of the image capturing apparatus 400 viewed from the prism side along the optical axis OA2. The configurations of the camera units 10a and 10b of this embodiment are the same as those described in the first embodiment, and thus the descriptions thereof will be omitted.

In the case where the two camera units 10a and 10b facing in the same direction are arranged in proximity, it is necessary to arrange them so as to avoid interference between image sensors 14. In particular, when the image sensor 14 of each of the camera units 10a and 10b is larger than the diameter of the object-side lens 11, the lateral width of the prism 12, or the diameter of the image-side lens 13, a distance between the optical axes OA1 of the camera units 10a and 10b is determined depending on the size of the image sensor 14. As illustrated FIG. 14, the interference between the image sensors 14 can be avoided by arranging the respective image sensors 14 of the camera units 10a and 10b in a direction away from each other with the optical axis OA2 inclined.

An axis that determines the orientation of the top and bottom of the image capturing apparatus 400 is referred to as a reference axis 401. Similarly to the first embodiment, when the angle between the reference axis 401 and the optical axis OA2 is a predetermined angle (angle θ4), the image sensor 14 is inclined by the predetermined angle (angle θ4) with respect to the optical axis OA1. As a result, in the images captured by the camera units 10a and 10b, the vertical and horizontal directions of the captured image and the direction of the reference axis 401 coincide with each other. Even when the inclined directions or the inclined angles of the optical axes OA2 are different in the respective camera units 10a and 10b, the vertical and horizontal directions of the images captured by the camera units 10a and 10b coincide with each other by appropriately setting the angle of the image sensor 14 with respect to the optical axis OA1 for each camera unit.

According to the image capturing apparatus 400 including the two camera units 10a and 10b facing in the same direction as in this embodiment, the two camera units 10a and 10b can be closely arranged without being limited by the size of the image sensor 14.

Fifth Embodiment

Figure 16:
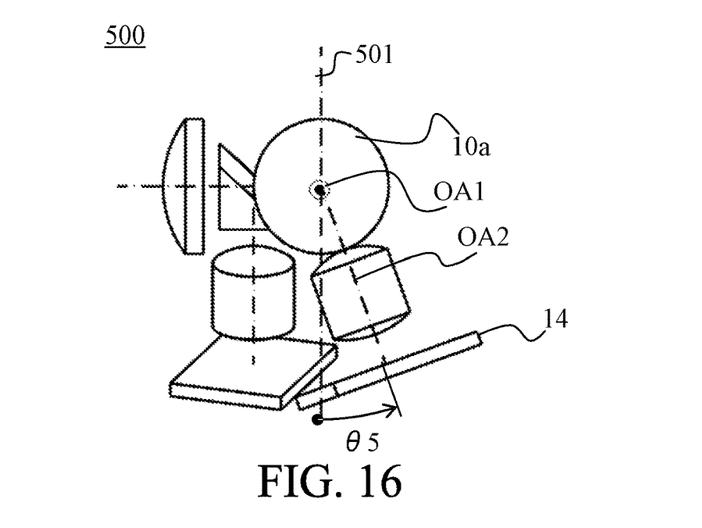
FIG. 16 is a view of the image capturing apparatus along an optical axis OA1 in the fifth embodiment.
Figure 17:
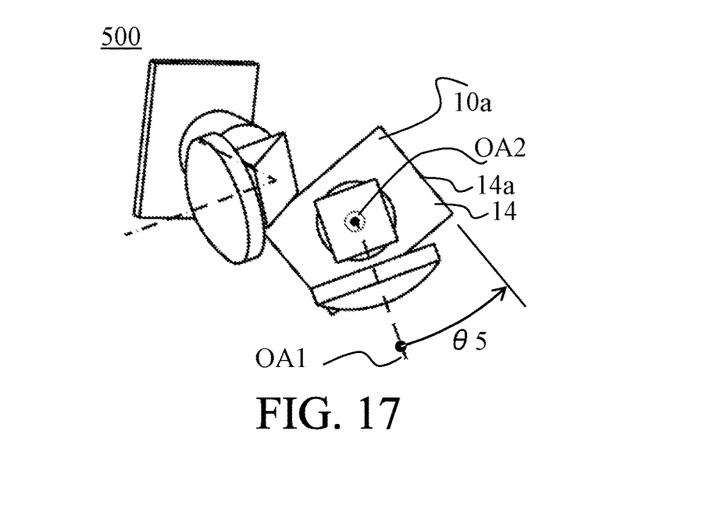
FIG. 17 is a view of the image capturing apparatus along an optical axis OA1 in the fifth embodiment.

Next, referring to FIGS. 15 to 17, an image capturing apparatus in a fifth embodiment of the present invention will be described. An image capturing apparatus 500 of this embodiment includes two camera units 10a and 10b facing in different directions. The optical axes OA1 of the two camera units 10a and 10b are in a positional relationship in which they are rotationally moved relative to each other with respect to a reference axis 501. The image capturing apparats 500 can combine images captured by the camera units 10a and 10b to generate an image with a wider field of view.

Figure 15:
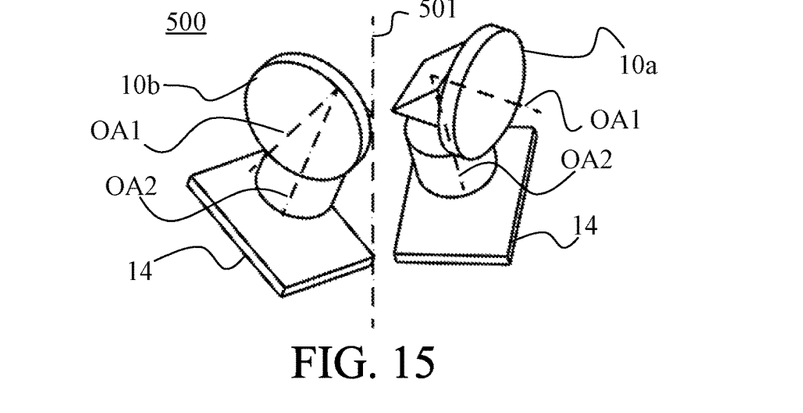
FIG. 15 is an overhead view of an image capturing apparatus in a fifth embodiment.

FIG. 15 is an overhead view of an image capturing apparats 500 in this embodiment. FIG. 16 is a view of the image capturing apparats 500 viewed from the object side along the optical axis OA1. FIG. 17 is a view of the image capturing apparats 500 viewed from the prism side along the optical axis OA2. The configurations of the camera units 10a and 10b of this embodiment are the same as those described in the first embodiment, and thus the descriptions thereof will be omitted.

In this embodiment, the optical axes OA2 of the camera units 10a and 10b are arranged by using the prism 12 in a direction away from the image sensor 14. In this case, the optical axis OA2 forms a predetermined angle (angle θ5) with respect to a reference axis 501, and the vertical or horizontal side 14a of the image sensor 14 is arranged to be at the predetermined angle (angle θ5) with respect to the optical axis OA1 when viewed from the prism along the optical axis OA2. Thus, as compared with the case where the optical axis OA2 is disposed in parallel to the reference axis 501, the distance between the image sensors 14 of the camera units 10a and 10b is larger. As a result, it is possible to install a large image sensor or to arrange the camera units 10a and 10b close to each other. Further, since the vertical and horizontal directions of the images captured by the camera units 10a and 10b are aligned, the images can be easily combined.

As described above, in each embodiment, the image capturing apparatus 100 (200, 300, 400, or 500) includes a plurality of image capturing units (camera units 10a to 10c, etc.) that are arranged with reference to a predetermined axis (reference axis 101, 201, 301, 401, or 501). Each of the plurality of image capturing units includes a first optical element (object-side lens 11), a second optical element (image-side lens 13), a third optical element (prism 12), and an image sensor (14). The first optical element is arranged at the object side and has a first optical axis (optical axis OA1). The second optical element is arranged at the image side and has a second optical axis (optical axis OA2). The third optical element bends the light beam from the first optical element to be introduced to the second optical element. In at least one of the plurality of image capturing units, the second optical axis is different from the direction of the predetermined axis (i.e., the second optical axis has a predetermined angle (angle θ1, θ2, θ3, θ4, or θ5) with respect to the predetermined axis).

Preferably, in at least one of the plurality of image capturing units, the direction of the first optical axis is different from the direction of each side 14a of the image sensor (any direction of the long side and the short side of the outer shape of the image sensor). More preferably, the angle between the second optical axis and the predetermined axis is equal to the angle between the first optical axis and the side of the image sensor. Preferably, in each of the plurality of image capturing units, the direction of the predetermined axis of the image formed on the image sensor and at least one side of the image sensor are parallel to each other. Preferably, the first optical axis in each of the plurality of image capturing units is rotationally symmetric with respect to the predetermined axis.

Preferably, the first optical axis in each of the plurality of image capturing units is arranged to equally divide an entire circumference around the predetermined axis (first embodiment). More preferably, the image capturing apparatus combines a plurality of images acquired by a plurality of image capturing units to generate an image of a continuous entire circumference. Preferably, the image capturing apparatus includes a second image capturing unit (camera unit 20) capable of imaging a range outside the imaging ranges of the plurality of image capturing units. The second image capturing unit includes a rectilinear optical system having a third optical axis (optical axis OA3) that is parallel to the direction of the predetermined axis. More preferably, the image capturing apparatus combines a plurality of images captured by the plurality of image capturing units with an image captured by the second image capturing unit to generate a continuous image. Preferably, the plurality of image capturing units are arranged in parallel two by two in the same direction (third embodiment). Preferably, the first optical axis in each of the plurality of image capturing units is perpendicular to the predetermined axis, and the first optical axes have a relation of a parallel movement in a direction perpendicular to one of the first optical axes (fourth embodiment).

According to each embodiment, in an image capturing apparatus that obtains a wide-field image by connecting a plurality of images captured by a plurality of optical systems (image capturing units), the image capturing apparatus capable of acquiring a high-quality wide-field image can be provided even when an image sensor is enlarged.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-171529, filed on Sep. 13, 2018 which is hereby incorporated by reference herein in its entirety.

What is claimed is:

1. An image capturing apparatus including a plurality of image capturing units that are arranged with reference to a predetermined axis, the plurality of image capturing units each comprising:
   a first optical element arranged at an object side, the first optical element having a first optical axis;
   a second optical element arranged at an image side, the second optical element having a second optical axis;
   a third optical element configured to bend a light beam from the first optical element to be introduced to the second optical element; and
   an image sensor,
   wherein the first optical axis in each of the plurality of the image capturing units is perpendicular to the predetermined axis,
   wherein the second optical axis in each of the plurality of the image capturing units is not perpendicular to nor parallel to the predetermined axis, the second optical axis having a predetermined acute angle with respect to the predetermined axis in order to prevent the image sensors of the plurality of image capturing units from interfering with each other,
   wherein a direction of the first optical axis in each of the plurality of the image capturing units is different from a direction of each side of the image sensor in each of the plurality of image capturing units,
   wherein in each of the plurality of the image capturing units, the predetermined acute angle between the second optical axis and the predetermined axis is equal to an angle between the first optical axis and the side of the image sensor, and
   wherein when viewed from the direction of the first optical axis, a distance in a direction of the second optical axis from a point where the first optical axis and the second optical axis intersect with each other to the image sensor is longer than a distance in the direction of the first optical axis from an apex of an incident surface of the first optical element to the point.

2. The image capturing apparatus according to claim 1, wherein in each of the plurality of image capturing units, a direction of the predetermined axis of an image formed on the image sensor and at least one side of the image sensor are parallel to each other.

3. The image capturing apparatus according to claim 1, wherein the first optical axis in each of the plurality of image capturing units is rotationally symmetric with respect to the predetermined axis.

4. The image capturing apparatus according to claim 3, wherein the first optical axis in each of the plurality of image capturing units is arranged to equally divide an entire circumference around the predetermined axis.

5. The image capturing apparatus according to claim 4, wherein the image capturing apparatus is configured to combine a plurality of images acquired by the plurality of image capturing units to generate an image of a continuous entire circumference.

6. The image capturing apparatus according to claim 1, further comprising a second image capturing unit capable of imaging a range outside imaging ranges of the plurality of image capturing units,
   wherein the second image capturing unit includes a third optical axis that is parallel to a direction of the predetermined axis.

7. The image capturing apparatus according to claim 6, wherein the image capturing apparatus is configured to combine a plurality of images captured by the plurality of image capturing units with an image captured by the second image capturing unit to generate a continuous image.

8. The image capturing apparatus according to claim 1, wherein the plurality of image capturing units are arranged in parallel two by two in the same direction.

9. The image capturing apparatus according to claim 1, wherein the first optical axis in each of the plurality of the image capturing units is perpendicular to the predetermined axis, and the first optical axes have a relation of a parallel movement in a direction perpendicular to each of the first optical axes.

* * * * *